(12) United States Patent
Torvinen et al.

(10) Patent No.: US 7,424,284 B2
(45) Date of Patent: Sep. 9, 2008

(54) SECURE NETWORK/SERVICE ACCESS

(75) Inventors: Vesa Torvinen, Turku (FI); Bengt Sahlin, Espoo (FI); Jani Hautakorpi, Jorvas (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 504 days.

(21) Appl. No.: 11/264,387

(22) Filed: Nov. 2, 2005

(65) Prior Publication Data
US 2006/0155995 A1 Jul. 13, 2006

Related U.S. Application Data

(60) Provisional application No. 60/626,722, filed on Nov. 10, 2004.

(30) Foreign Application Priority Data
Nov. 9, 2004 (GB) ................... 0424714.4

(51) Int. Cl.
*H04M 1/66* (2006.01)
*H04M 1/68* (2006.01)
*H04M 3/16* (2006.01)
*H04K 1/00* (2006.01)
*H04L 9/00* (2006.01)

(52) U.S. Cl. ............. 455/411; 455/410; 455/435.1; 455/432.1; 380/248; 380/247; 713/168

(58) Field of Classification Search ........ 455/411, 455/410, 435.1, 432.1; 380/248, 247; 713/168
See application file for complete search history.

(56) References Cited

U.S. PATENT DOCUMENTS

| 5,537,474 | A | * | 7/1996 | Brown et al. | ........... 380/248 |
| 5,596,641 | A | * | 1/1997 | Ohashi et al. | ........... 380/248 |
| 6,996,620 | B2 | * | 2/2006 | Chang et al. | ........... 709/227 |
| 7,016,690 | B2 | * | 3/2006 | Corson et al. | ........... 455/456.1 |
| 7,107,248 | B1 | * | 9/2006 | Asokan et al. | ........... 705/67 |

(Continued)

OTHER PUBLICATIONS

GB Search Report mailed Feb. 13, 2006 in corresponding GB application No. GB0522337.5.

*Primary Examiner*—Dwayne Bost
*Assistant Examiner*—Huy D Nguyen
(74) *Attorney, Agent, or Firm*—Nixon & Vanderhye, P.C.

(57) ABSTRACT

A method of authenticating a user access network to a mobile node, where the mobile node wishes to access a service via the access network, the method comprising:

establishing a secure transport channel between the mobile node and a service access node of the visited network, said channel being bound to an identity of the service access node;

sending an authorization request from the mobile node to the service access node, incorporating an identity of the service access node into the request at the service access node, and forwarding the request to an authorization node of the user's home network;

at said authorization node of the home network, authorizing the service access node, and sending to the service access node a user challenge including the identity of the service access node, said identity being included in such a way that a change to the identity can be detected by a recipient;

at the serving access node, forwarding the received user challenge to the mobile node; and at the mobile node verifying whether or not the identity bound to the secure transport channel matches the identity contained in the received challenge.

12 Claims, 2 Drawing Sheets

U.S. PATENT DOCUMENTS

| | | | |
|---|---|---|---|
| 7,289,462 B1 * | 10/2007 | Mizell et al. | 370/328 |
| 7,356,145 B2 * | 4/2008 | Ala-Laurila et al. | 380/247 |
| 2001/0049790 A1 * | 12/2001 | Faccin et al. | 713/185 |
| 2002/0161723 A1 * | 10/2002 | Asokan et al. | 705/67 |
| 2003/0226017 A1 | 12/2003 | Palekar et al. | |
| 2003/0233546 A1 * | 12/2003 | Blom | 713/168 |
| 2004/0187018 A1 * | 9/2004 | Owen et al. | 713/200 |
| 2004/0248571 A1 * | 12/2004 | Robinson et al. | 455/433 |
| 2005/0083904 A1 * | 4/2005 | Khartabil et al. | 370/351 |

* cited by examiner

SECURE NETWORK/SERVICE ACCESS

This application claims the benefit and priority of U.S. Provisional Patent Application 60/626,722, filed Nov. 10, 2004 and GB application 0424714.4, filed Nov. 9, 2004, the entire contents of which are incorporated by reference in their entirety.

FIELD OF THE INVENTION

The present invention relates to a method and apparatus for providing secure network/service access to a mobile node.

BACKGROUND

Various Third Generation Protocol Partnership (3GPP) sub-system architectures are based on roaming models, i.e. where a user is accessing services via a visited network rather than via his or her home network. The roaming model was first adopted at lower layer networks but was later deployed also to upper layers and used for applications such as the IP Multimedia Sub-system (IMS).

Roaming models can be difficult to implement, especially at the application layer. For example, if the access security solution is based on a model in which the entity (access node) in the visited network is authenticated to a mobile node by a Transport Layer Security (TLS) certificate (TLS is a standard produced by the European Telecommunications Standards Institute (ETSI)), but the mobile node is authenticated using credentials shared only with the home network (e.g. Hypertext Transport Protocol (HTTP) Digest AKA), the mobile node cannot easily determine whether or not the entity in the visited network should be trusted. Secure access will necessitate such a determination in order to prevent the threat of so-called "man-in-the-middle" attacks where an attacker seeks to place a fraudulent node between the mobile node and the visited network entity. Because the mobile node authentication is not tied to the underlying security, the attacker can tunnel HTTP Digest messages between different tunnels and even different protocols.

A means to address this problem is to apply global naming restrictions to all entities in the visited networks. In this way, the mobile node could verify that a given entity belongs to a common "trust domain". However, this might cause configuration problems, and may not be acceptable from a business point of view. Furthermore, the solution is not very flexible, and cannot be changed once agreed.

It is an object of the present technology to allow the home network to explicitly verifying the used roaming model to a client in a secure way. This verification may be done according to the HTTP Digest authentication framework if the roaming model is reflected in some authenticated parameter or protected in some other way.

According to a first aspect of the present technology there is provided a method of authenticating a user access network to a mobile node, where the mobile node wishes to access a service via the access network, the method comprising:

establishing a secure transport channel between the mobile node and a service access node of the visited network, said channel being bound to an identity of the service access node;

sending an authorisation request from the mobile node to the service access node, incorporating an identity of the service access node into the request at the service access node, and forwarding the request to an authorisation node of the user's home network;

at said authorisation node of the home network, authorising the service access node, and sending to the service access node a user challenge including the identity of the service access node, said identity being included in such a way that a change to the identity can be detected by a recipient;

at the service access node, forwarding the received user challenge to the mobile node; and at the mobile node verifying whether or not the identity bound to the secure transport channel matches the identity contained in the received challenge.

Assuming that the mobile node verifies that the identity bound to the secure transport channel matches the identity contained in the received challenge, a subsequent step of sending a challenge response to the authorisation node via the service access node may be carried out. The authorisation node then verifies that the identity contained in the response has not been changed.

The mobile node may comprise a SIP UA, where said service access node is a SIP P-CSCF and said authorisation node is a S-CSCF. Said authorisation request is a SIP REGISTER message, and said challenge is a SIP 401 message.

The service access node comprises an HTTP proxy, and said authorisation node may comprise an HTTP server, and said authorisation request may be an HTTP request.

Said secure transport channel may be established according to TLS, said identity being included in a TLS certificate.

The authorisation node may generate a new roaming domain/realm name for the roaming agreement by combining a visited network domain name with a home network domain name, the new domain/realm name being included in said user challenge.

According to a second aspect of the present technology there is provided a user terminal for allowing a user to access a service via a visited communication network, the terminal comprising:

means for establishing a secure transport channel between the user terminal and a service access node of the visited network, said channel being bound to an identity of the service access node;

means for sending an authorisation request to the service access node, for forwarding by the service access node to an authorisation node of the user's home network;

means for receiving from said authorisation node via the service access node a user challenge including the identity of the service access node, said identity being included in such a way that a change to the identity can be detected by the user terminal; and means for verifying whether or not the identity bound to the secure transport channel matches the identity contained in the received challenge.

Said means for establishing a secure transport channel between the user terminal and a service access node may be means for establishing a channel according to TLS.

Said authorisation request may be a SIP REGISTER or an HTTP request.

According to a third aspect of the present technology there is provided an access node for providing a user terminal with access to a service while roaming outside of the user's home network, the access node comprising:

means for establishing a secure transport channel between the user terminal and the access node, said channel being bound to an identity of the service access node;

means for receiving an authorisation request from the user terminal and for incorporating an identity of the access node into the request;

means for forwarding the request to an authorisation node of the user's home network;
means for receiving from the authorisation node a user challenge including the identity of the service access node, said identity being included in such a way that a change to the identity can be detected by a recipient; and
means for forwarding the received user challenge to the user terminal.

According to a fourth aspect of the present technology there is provided an authorisation node for use in a home network of a user of a user terminal, where the user terminal can establish a secure transport channel between itself and a service access node of the visited network, said channel being bound to an identity of the service access node, the authorisation node comprising:
means for receiving an authorisation request from the mobile node via the service access node, the service access node having incorporated into the request an identity of the service access node; and
means for authorising the service access node and for sending to the user terminal via the service access node a user challenge including the identity of the service access node, said identity being included in such a way that a change to the identity can be detected by a recipient.

DETAILED DESCRIPTION OF CERTAIN EMBODIMENTS

Consider a scenario where a user utilises a mobile node (UE), and the user is a subscriber of his or her Home network. The user is currently roaming outside of the coverage of the Home network and is within the coverage area of a Visited network.

As discussed above, when the user seeks to register with the Visited network, authentication is achieved by the Home network authenticating the user, and confirming this verification to the visited network. More particularly, authentication is performed using HTTP Digest between the mobile node and the Home network. Security between the mobile node and an access node of the Visited network may be based on Transport Layer Security (TLS), although other protocols such as HTTP Digest AKA may alternatively be used. For the purpose of authenticating the user to the Home network, the access node acts as an HTTP proxy.

Figure 1:
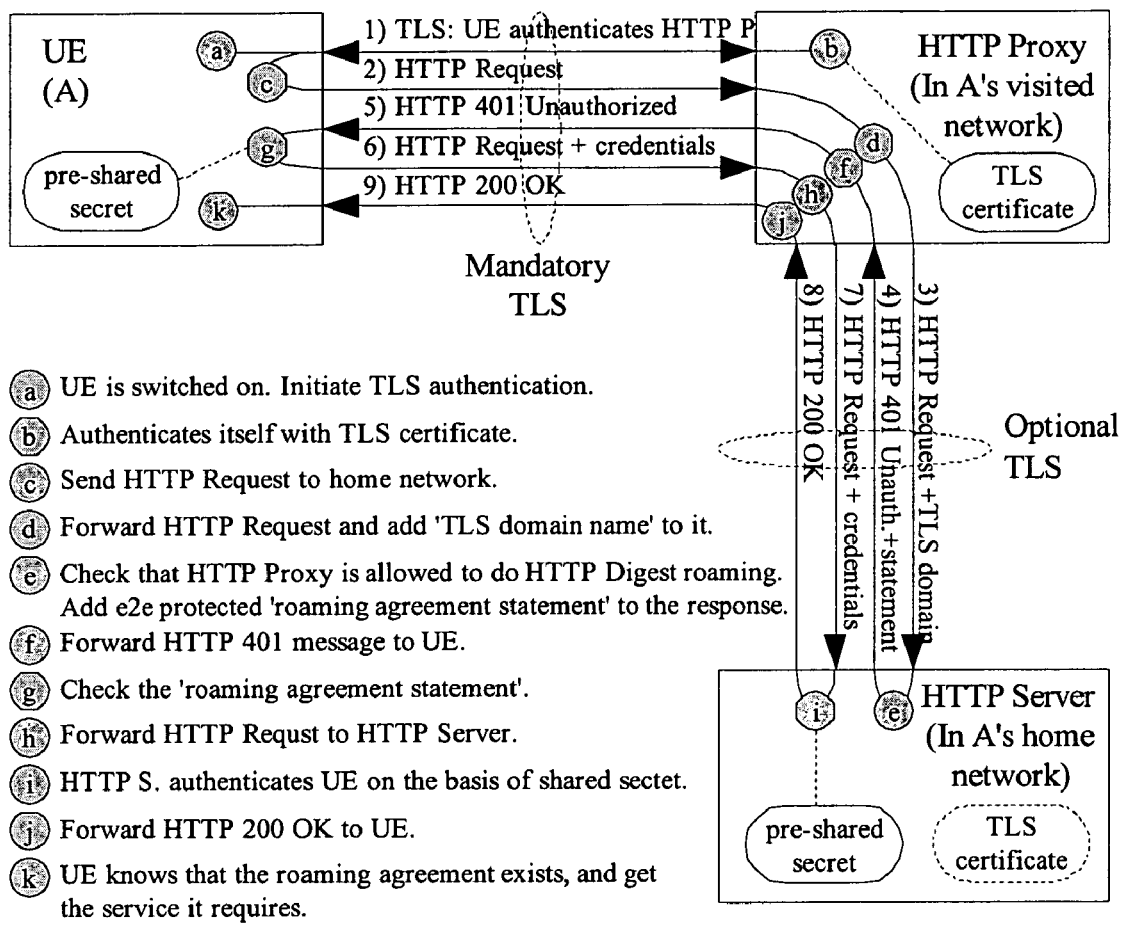
FIG. 1 illustrates schematically a mechanism for authorising a mobile node in a roaming architecture.

FIG. 1 illustrates schematically the various elements involved in the authentication chain including the UE, the access node (HTTP proxy) in the visited network, and the HTTP server in the Home network.

With reference to FIG. 1, an authentication procedure according to an example embodiment requires the following steps:

1) The UE authenticates the HTTP proxy using the TLS server certificate base procedure. The HTTP proxy does not authenticate the UE with TLS.
2) The UE sends an HTTP request (typically an HTTP GET) to the HTTP proxy.
3) The HTTP proxy recognizes that the request is intended for the HTTP server. The HTTP proxy adds its own TLS domain name to the request, and forwards it to HTTP server.
4) The HTTP server checks whether or not the HTTP proxy is authorized to use HTTP Digest based roaming. If yes, the HTTP server returns an HTTP Digest challenge to the HTTP proxy. The challenge includes an explicit statement about the roaming agreement between the HTTP proxy and the HTTP server. The roaming statement is protected end-to-end between the HTTP server and the UE. End-to-end protection can be achieved, for example, by constructing a new protection domain/realm for this roaming agreement, and adding that domain/realm name to the HTTP Digest authentication challenge. If the HTTP proxy TLS domain name is "vn.proxy.com", and the HTTP server domain name is "hn.server.com", the new roaming domain name could be "hn.server.com@vn.proxy.com". The HTTP proxy domain name is taken from message 3). The HTTP server may verify the correctness of the HTTP proxy domain name, e.g. from an HTTP proxy TLS client certificate if TLS is used also between the HTTP proxy and the HTTP server.
5) The HTTP proxy forwards the 401 response message towards the UE.
6) From the HTTP Digest challenge, the UE can see that the HTTP proxy and HTTP server have a roaming agreement. The UE compares the HTTP proxy domain name in the HTTP Digest challenge and that of the TLS server certificate and, if they match, it continues the process according to standard HTTP Digest procedures. The UE requires mutual authentication from the HTTP server in order to be certain that the roaming agreement really exists.
7) HTTP proxy tunnels the HTTP Digest response to the HTTP server.
8) HTTP server authenticates the UE. The HTTP server must check that the roaming statement is protected end-to-end, e.g. that the protection domain/realm has not been modified, and that the authentication response has been calculated using the correct protection domain/realm name. If this is confirmed, the HTTP server notifies the HTTP proxy to deliver the service. If authentication fails, the HTTP server rejects the request and informs the HTTP proxy accordingly.
9) The HTTP proxy forwards the response from the HTTP server to the UE. If the authentication was successful in the HTTP server, the UE will receive the service. The UE may use this as a hint that a roaming agreement exists. If mutual authentication between the UE and the HTTP server was used, the UE can be sure that the roaming agreement was really verified by the HTTP server.

Figure 2:
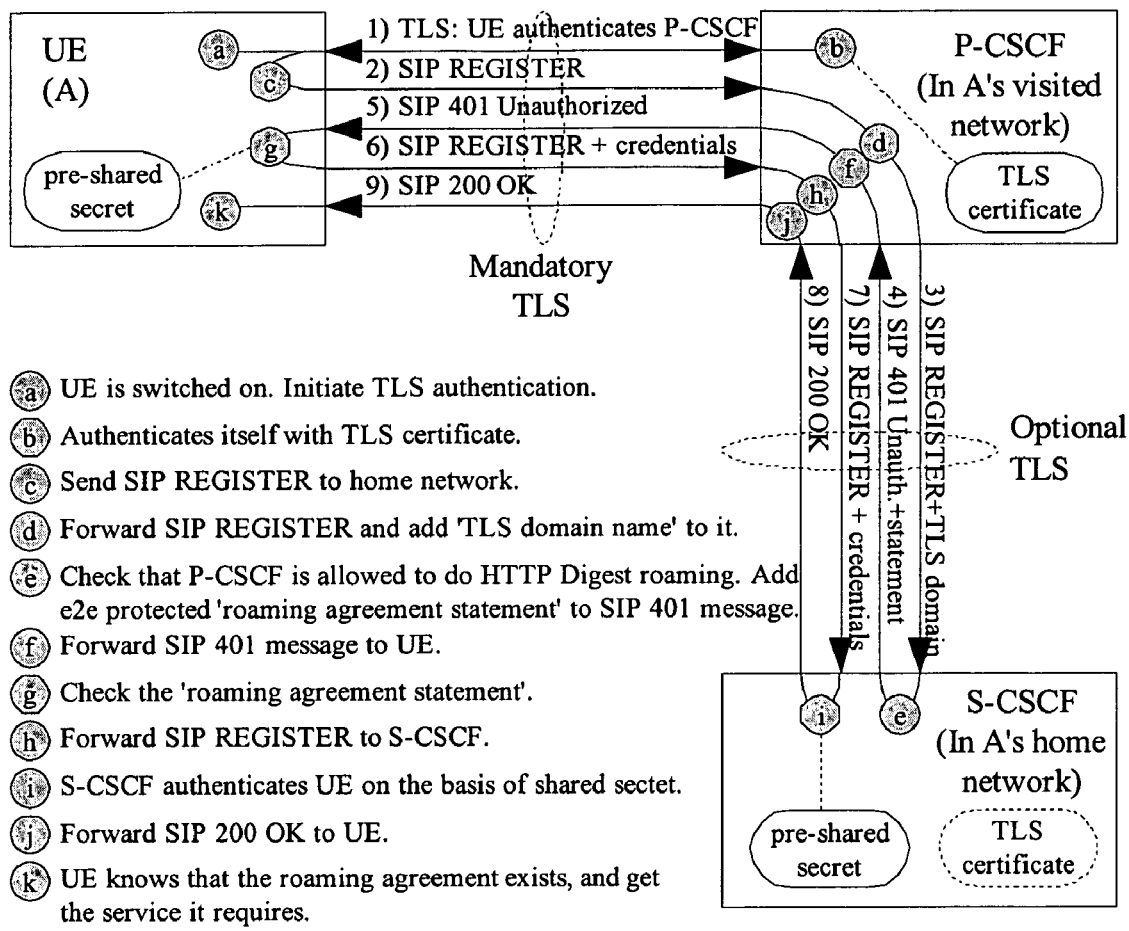
FIG. 2 illustrates in detail a mechanism for authorising a mobile node in a 3G IMS architecture.

With reference now to FIG. 2, this illustrates a second example demonstrating the application to the 3GPP IP Multimedia Sub-system (IMS). The example assumes again that HTTP Digest AKA is used between the UE and the Serving Call State Control Function (S-CSCF) in the home network. Security between the UE and the Proxy Call State Control Function (P-CSCF) in the visited network is based on TLS. The use of other HTTP based authentication protocols may also be possible. For example, the UE and the S-CSCF may use HTTP Digest or some updated version of HTTP Digest AKA. The procedure has the following steps:

1) The UE authenticates the P-CSCF using the TLS server certificate. The P-CSCF does not authenticate the UE with TLS.
2) The UE sends a SIP REGISTER request to the P-CSCF.
3) The P-CSCF recognises that the request is intended for the S-CSCF. HTTP proxy P-CSCF adds its own TLS domain name to the request, and forwards it to the S-CSCF.
4) The S-CSCF checks if the P-CSCF is authorized to use HTTP Digest based roaming. If so, then the S-CSCF returns an HTTP Digest challenge to the P-CSCF. The challenge includes an explicit statement about the roaming agreement between the P-CSCF and the S-CSCF. The roaming statement is protected end-to-end between the S-CSCF and the UE. End-to-end protection can be achieved, for example, by constructing a new protection domain/realm for this roaming agreement, and adding that domain/realm name to the HTTP Digest AKA authentication challenge. If for example the P-CSCF TLS domain name is "vn.pcscf.com", and the home domain name is "HTTP server.sip.com", the new roaming domain name could be "HTTP server.sip.com@vn.pcscf.com". The P-CSCF domain name is taken from message 3). The S-CSCF may verify the correctness of the P-CSCF domain name, e.g. from the P-CSCF TLS client certificate if TLS is used also between the P-CSCF and the S-CSCF.

5) The P-CSCF forwards the 401 response message towards the UE.

6) From the HTTP Digest AKA challenge, the UE can see that the P-CSCF and the S-CSCF have a roaming agreement. The UE compares the P-CSCF domain name in the HTTP Digest AKA challenge with that in the TLS server certificate and, if they match, it continues with the standard HTTP Digest AKA procedure. The UE should require HTTP Digest based mutual authentication from the HTTP server in order to be sure that the roaming agreement really exists.

7) The P-CSCF tunnels the HTTP Digest response to the S-CSCF.

8) The S-CSCF authenticates the UE. The S-CSCF must check that the roaming statement is protected end-to-end, e.g. that the protection domain/realm has not been modified, and that the authentication response has been calculated using the correct protection domain/realm name. If confirmed, the S-CSCF updates the registration state. If authentication fails, the S-CSCF rejects the request.

9) The P-CSCF forwards the response from the S-CSCF to the UE.

If the authentication was successful in S-CSCF, the UE will receive the service. Again, the UE may use this as a hint that a roaming agreement exists. If mutual authentication between the UE and the S-CSCF was used, the UE can be sure that the roaming agreement was really verified by the S-CSCF.

This technology may be standardized in 3GPP/IMS as a solution for TLS based access security. The same solution could be used in TISPAN NGN access security.

It will be appreciated by the person of skill in the art that various modifications may be made to the above described embodiments without departing from the scope of the present invention.

The invention claimed is:

1. A method of authenticating a user access network to a mobile node, where the mobile node wishes to access a service via the access network, the method comprising:
    establishing a secure transport channel between the mobile node and a service access node of the access network, said channel being bound to an identity of the service access node;
    sending an authorisation request from the mobile node to the service access node, incorporating an identity of the service access node into the request at the service access node, and forwarding the request to an authorisation node of the user's home network;
    at said authorisation node of the home network, authorising the service access node, and sending to the service access node a user challenge including the identity of the service access node, said identity being included in such a way that a change to the identity can be detected by a recipient;
    at the service access node, forwarding the received user challenge to the mobile node; and
    at the mobile node verifying whether or not the identity bound to the secure transport channel matches the identity contained in the received challenge.

2. A method according to claim 1 and, assuming that the mobile node verifies that the identity bound to the secure transport channel matches the identity contained in the received challenge, carrying out a subsequent step of sending a challenge response to the authorisation node via the service access node, and at the authorisation node verifying that the identity contained in the response has not been changed.

3. A method according to claim 1, wherein said mobile node comprises a SIP UA, and said service access node is a SIP P-CSCF and said authorisation node is a S-CSCF.

4. A method according to claim 1, wherein said authorisation request is a SIP REGISTER message, and said challenge is a SIP 401 message.

5. A method according to claim 1, wherein said service access node comprises an HTTP proxy, and said authorisation node comprises an HTTP server, and said authorisation request is an HTTP request.

6. A method according to claim 1, wherein said secure transport channel is established according to TLS, said identity being included in a TLS certificate.

7. A method according to claim 1, the authorisation node generating a new roaming domain/realm name for the roaming agreement by combining a visited network domain name with a home network domain name, the new domain/realm name being included in said user challenge.

8. A user terminal for allowing a user to access a service via a visited communication network, the terminal comprising:
    means for establishing a secure transport channel between the user terminal and a service access node of the visited network, said channel being bound to an identity of the service access node;
    means for sending an authorisation request to the service access node, for forwarding by the service access node to an authorisation node of the user's home network;
    means for receiving from said authorisation node via the service access node a user challenge including the identity of the service access node, said identity being included in such a way that a change to the identity can be detected by the user terminal; and
    means for verifying whether or not the identity bound to the secure transport channel matches the identity contained in the received challenge.

9. A user terminal according to claim 8, wherein said means for establishing a secure transport channel between the user terminal and a service access node is means for establishing a channel according to TLS.

10. A user terminal according to claim 8, wherein said authorisation request is a SIP REGISTER or an HTTP request.

11. An access node for providing a user terminal with access to a service while roaming outside of the user's home network, the access node comprising:
    means for establishing a secure transport channel between the user terminal and the access node, said channel being bound to an identity of the service access node;
    means for receiving an authorisation request from the user terminal and for incorporating an identity of the access node into the request;

means for forwarding the request to an authorisation node of the user's home network;

means for receiving from the authorisation node a user challenge including the identity of the service access node, said identity being included in such a way that a change to the identity can be detected by a recipient; and means for forwarding the received user challenge to the user terminal.

12. An authorisation node for use in a home network of a user of a user terminal, where the user terminal can establish a secure transport channel between itself and a service access node of the visited network, said channel being bound to an identity of the service access node, the authorisation node comprising:

means for receiving an authorisation request from the mobile node via the service access node, the service access node having incorporated into the request an identity of the service access node; and means for authorising the service access node and for sending to the user terminal via the service access node a user challenge including the identity of the service access node, said identity being included in such a way that a change to the identity can be detected by a recipient.

* * * * *